US009590772B2

(12) United States Patent
Choi et al.

(10) Patent No.: US 9,590,772 B2
(45) Date of Patent: Mar. 7, 2017

(54) SIMULTANEOUS TRANSMIT AND RECEIVE

(71) Applicant: INTEL CORPORATION, Santa Clara, CA (US)

(72) Inventors: Yang-Seok Choi, Portland, OR (US); Hooman Shirani-Mehr, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,256

(22) PCT Filed: Jun. 27, 2013

(86) PCT No.: PCT/US2013/048345
§ 371 (c)(1),
(2) Date: Dec. 10, 2013

(87) PCT Pub. No.: WO2014/008106
PCT Pub. Date: Jan. 9, 2014

(65) Prior Publication Data
US 2014/0301217 A1  Oct. 9, 2014

Related U.S. Application Data

(60) Provisional application No. 61/667,325, filed on Jul. 2, 2012.

(51) Int. Cl.
H04L 5/14 (2006.01)
H04L 5/00 (2006.01)
(Continued)

(52) U.S. Cl.
CPC .......... H04L 1/1861 (2013.01); H04L 1/0025 (2013.01); H04L 1/0026 (2013.01);
(Continued)

(58) Field of Classification Search
CPC . H04L 5/16; H04L 1/0026; H04L 5/14; H04L 47/626; H04L 5/006; H04W 72/042;
(Continued)

(56) References Cited

U.S. PATENT DOCUMENTS

2007/0217433 A1* 9/2007 Doppler ............... H04B 7/02
370/400
2007/0230375 A1 10/2007 Yomo et al.
(Continued)

FOREIGN PATENT DOCUMENTS

WO    WO 2006/106378 A1    10/2006
WO       2010/029354 A1     3/2010
(Continued)

OTHER PUBLICATIONS

International Search Report and Written Opinion received for PCT Patent Application No. PCT/US2013/048345, mailed on Oct. 16, 2013, 10 Pages.

Primary Examiner — Hoang-Chuong Vu
(74) Attorney, Agent, or Firm — Thorpe North & Western

(57) ABSTRACT

A simultaneous transmit and receive (STR) technology is described. The eNB is configured with a downlink centric measurement threshold and an uplink centric measurement threshold which increase overall capacity in the wireless cellular network. A signal measurement command is transmitted from the eNB to the UE instructing the UE to take a signal quality measurement. The signal quality measurement is received from the UE at the eNB. It is determined whether the signal quality measurement is greater than the downlink centric measurement threshold and whether the signal quality measurement is greater than the uplink centric measurement threshold. The downlink centric measurement threshold, the uplink centric measurement threshold, and the
(Continued)

DL/UL ratio are configured to increase capacity in the wireless cellular network through selective use of STR.

6 Claims, 12 Drawing Sheets

(51) Int. Cl.
| | |
|---|---|
| H04W 24/10 | (2009.01) |
| H04L 1/18 | (2006.01) |
| H04W 28/08 | (2009.01) |
| H04W 72/04 | (2009.01) |
| H04W 52/02 | (2009.01) |
| H04W 72/00 | (2009.01) |
| H04W 92/02 | (2009.01) |
| H04W 4/00 | (2009.01) |
| H04W 36/22 | (2009.01) |
| H04W 48/12 | (2009.01) |
| H04W 68/00 | (2009.01) |
| H04L 1/00 | (2006.01) |
| H04L 1/16 | (2006.01) |
| H04W 88/08 | (2009.01) |

(52) U.S. Cl.
CPC .......... *H04L 1/1628* (2013.01); *H04L 1/1812* (2013.01); *H04L 1/1854* (2013.01); *H04L 1/1887* (2013.01); *H04L 5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0209* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04L 5/0048* (2013.01); *H04L 5/0053* (2013.01); *H04W 88/08* (2013.01); *Y02B 60/50* (2013.01); *Y02E 40/62* (2013.01)

(58) Field of Classification Search
CPC .......... H04W 72/0406; H04W 72/082; H04W 72/1231; H04W 72/085; H04W 36/26; H04W 36/30; H04W 88/06; H04B 1/401; H04B 1/7097; H04B 1/56
See application file for complete search history.

(56) References Cited

U.S. PATENT DOCUMENTS

| | | | | |
|---|---|---|---|---|
| 2007/0254692 | A1* | 11/2007 | McCoy | H04B 1/38 |
| | | | | 455/553.1 |
| 2008/0151792 | A1* | 6/2008 | Taich | H04L 7/033 |
| | | | | 370/294 |
| 2008/0247535 | A1* | 10/2008 | Li | H04M 9/082 |
| | | | | 379/406.08 |
| 2008/0298281 | A1 | 12/2008 | Hunkeler | |
| 2009/0213765 | A1* | 8/2009 | Rinne | H04B 1/44 |
| | | | | 370/278 |
| 2010/0110942 | A1 | 5/2010 | Cai et al. | |
| 2010/0240312 | A1* | 9/2010 | Peng | H04W 72/02 |
| | | | | 455/63.1 |
| 2011/0222445 | A1* | 9/2011 | Alanara | H04W 36/06 |
| | | | | 370/281 |
| 2012/0224497 | A1* | 9/2012 | Lindoff | H04B 1/525 |
| | | | | 370/252 |

FOREIGN PATENT DOCUMENTS

| | | |
|---|---|---|
| WO | WO 2010/076604 A1 | 7/2010 |
| WO | 2014/008106 A1 | 1/2014 |

* cited by examiner

SIMULTANEOUS TRANSMIT AND RECEIVE

RELATED APPLICATIONS

The present application claims priority to U.S. Provisional Patent Application No. 61/667,325, filed Jul. 2, 2012, the entire specification of which is hereby incorporated by reference in its entirety for all purposes.

BACKGROUND

Capacity in wireless communication networks is generally limited by the radio spectrum available. The capacity of a wireless communication network, therefore, depends on efficient use of the available radio spectrum. Since the radio spectrum allocated to a wireless cellular network is often fixed and because network operators generally desire increase capacity, there are efforts to make more efficient use of the allocated radio spectrum.

In a wireless cellular network, the allocated radio spectrum is often divided, for example, by time, frequency, and/or space. For instance, the allocated radio spectrum may be divided into a subset of frequency channels. The frequency channels are usually spaced far enough apart so that they do not overlap and generate cross-channel interference. In this regard, each of these channels may be used independently of one another since they use a separate frequency range. In a wireless cellular network, some channels may be dedicated to downlink communication and other channels may be dedicated to uplink communication.

Radio spectrum may also be divided by time and/or space. An uplink channel, for instance, may be divided into distinct time slots. Each user equipment (UE) in the wireless cellular network may be assigned a time slot in which the UE is granted the right to transmit data on the uplink channel. In this sense, the radio spectrum is said to be time divided. Radio spectrum may also be divided by space by reusing, for example, frequencies in disparate locations. For instance, a plurality of cells in the wireless cellular network may cover non-overlapping areas such that a given frequency may be reused across the plurality of cells without experiencing interference on the given frequency.

DETAILED DESCRIPTION

Figure 1:
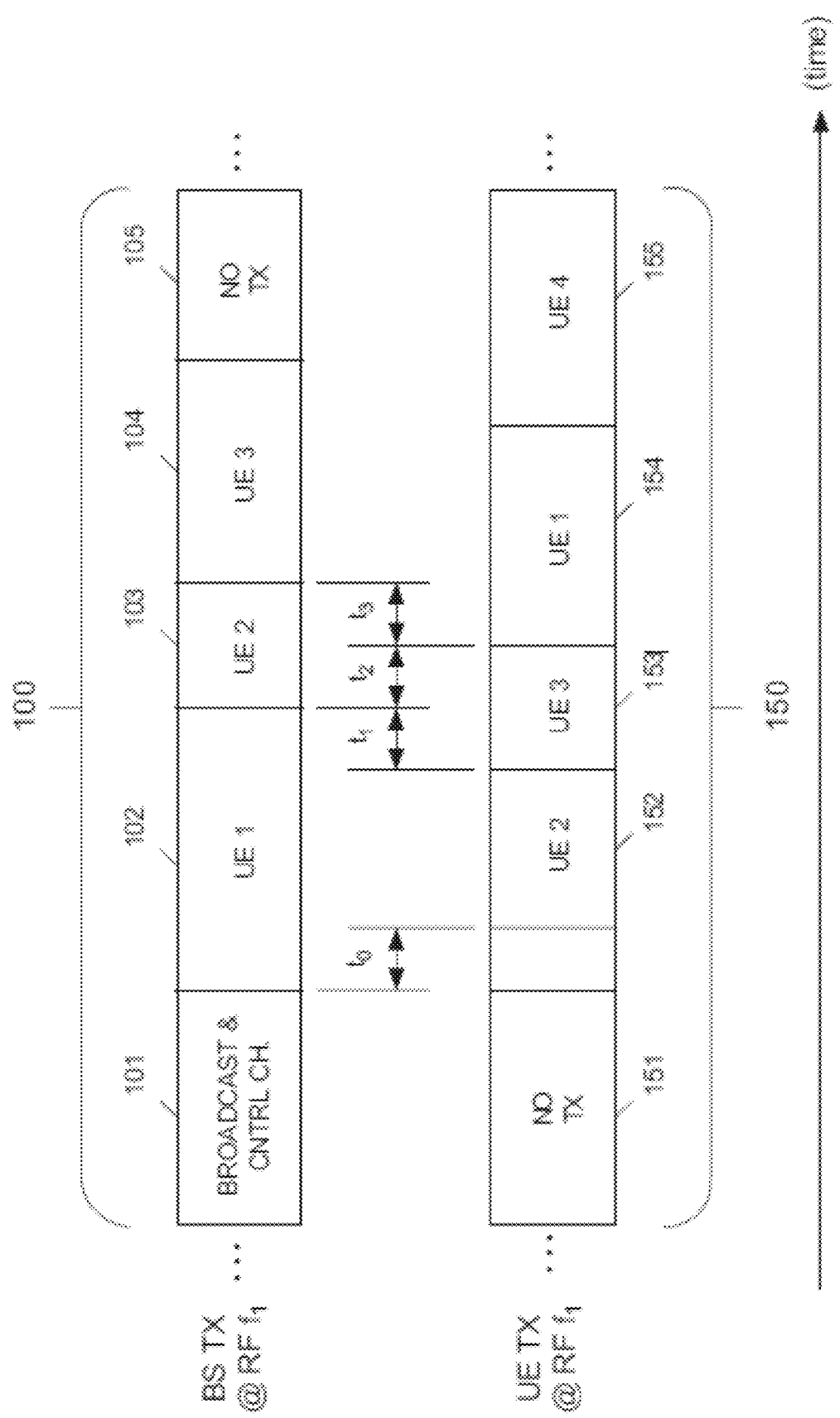
FIG. 1 depicts a temporal relationship diagram for simultaneous transmit and receive (STR) for a portion of an exemplary downlink radio frame and a portion an exemplary uplink radio frame of a channel.

A technology is described that reduces interference between user equipments (UEs) in a wireless cellular network using simultaneous transmission and reception (STR). In particular, an uplink (UL) centric measurement threshold and a downlink (DL) centric measurement threshold are configured based on a DL/UL ratio of a base station (BS; e.g. an Evolved Node B (eNB)) in the wireless cellular network. While the term base station, or eNB, is used throughout the application, it is not intended to be limiting. As used herein the term base station can refer to any transceiver in a cellular type communication system that is configured to communicate with one or more mobile stations or user equipment. Likewise, while the term user equipment (UE) is used throughout the application, it is not intended to be limiting. As used herein, the term user equipment can refer to any transceiver in a cellular type communication system that is configured to communicate with one or more base stations, or primarily intended to be used by subscribers of a cellular type communication system. This can include communication systems configured to operate based on standards such as the Institute of Electronic and Electrical Engineers (IEEE) 802.16e-2005 and 802.16m-2011 and Third Generation Partnership Project (3GPP) Long Term Evolution Release 8, 9, 10 and 11. Other cellular systems that are configured to allow a single transceiver base station or enhanced node B) to communicate with multiple mobile communication devices are also considered to be within the scope of the application.

STR allows transmission on the same frequency at the same time and can potentially double the physical layer capacity. STR can also be referred to as full duplex communication. The use of STR may introduce two new unique interferences into a wireless cellular network comprised of base stations and user equipment (UE). Namely, BS-BS interference and UE-UE interference may occur as a result of STR. These two new interferences may degrade system performance if not handled appropriately. The technology provides devices, systems and methods to minimize UE-UE interference. More specifically, the technology may be used to increase capacity in a wireless cellular network through selective use of STR.

For example, two user equipments, UE1 and UE2, may be located adjacent to one another. Further, while adjacent, UE1 and UE2 may also be located within the cell area of eNB1 and eNB2, respectively. UE1, UE2, eNB1 and eNB2 may be using STR. In using STR, the uplink (UL) of UE1 may create co-channel interference with the UL of UE2. Further, in using STR, the UL of UE1 may also create interference with the downlink (DL) of UE2.

STR or full duplex systems may not only improve the physical layer capacity but may also provide other important benefits in layers beyond the physical layer. For example, STR may reduce end-to-end delay in multi-hop networks. In half duplex systems, each node can start transmission of a packet to the next node only when it is fully received from the prior node in network. Therefore, the end-to-end delay is equal to packet duration multiplied by the number of hops. However, when STR is employed, a node can forward a packet while receiving it, and consequently the end-to-end delay in STR systems can be just a bit longer than the packet duration. This will be a huge advantage over half duplex systems especially as the number of hops grows. Meanwhile, the forwarded packet to next node can play a role of implicit acknowledgement (ACK) to the previous node as well.

STR may achieve the doubled capacity especially in isolated links such as point-to-point communications and wireless backhaul. In cellular systems, however, the situation is different, and additional measurements may have to be taken. In addition to the regular co-channel interference present in half duplex systems, namely base station (BS) to UE and UE to BS interferences, there are two unique interferences caused by system operation in full duplex mode: BS-BS interference, and UE-UE interference.

To reduce UE-UE interference and increase capacity in a full duplex wireless communication system, STR may be selectively used. Thresholds, for instance, may be set based on one or more measured signal qualities at a UE.

Detailed discussion will first be made concerning STR by referencing, in particular, FIGS. 1-6. Discussion will then be made concerning UE-UE interference and the selective use of STR to increase capacity in a wireless cellular network by referencing, in particular, FIGS. 7-13. Accordingly, FIG. 1 depicts a temporal relationship diagram for simultaneous transmit and receive (STR) for a portion of an exemplary downlink radio frame and a portion an exemplary uplink radio frame of a channel. STR allows transmit and receive operations to occur simultaneously at the same RF carrier. Accordingly, STR can increase channel capacity to up to twice that of a conventional Time Division Duplexing (TDD) based and/or Frequency Division Duplexing (FDD) based channel because the downlink (DL) and uplink (UL) channels share the same RF carrier both in time and in frequency resources. In one exemplary embodiment, the network infrastructure (i.e., the base station (BS), enhanced NodeB (eNB) femtocell, home eNB etc.) implements simultaneous transmit and receive according to the subject matter disclosed herein if a user equipment (UE) can simultaneously transmit and receive at the same frequency. More specifically, FIG. 1 depicts the general temporal relationship between an exemplary portion of a downlink (DL) radio frame 100 and an exemplary portion of an uplink (UL) radio frame 150 for simultaneous transmit and receive according to the subject matter disclosed herein. Both DL radio frame 100 and UL radio frame 150 are at the same exemplary RF carrier frequency $f_1$. Exemplary DL radio frame 100 includes a Broadcast Control Channel portion 101; a second portion 102 in which a DL transmission from the eNB to an exemplary UE 1 is scheduled; a third portion 103 in which a DL transmission from the eNB to an exemplary UE 2 is scheduled; a fourth portion 104 in which a DL transmission from the eNB to an exemplary UE 3 is scheduled; and a fifth portion 105 in which no DL transmission is scheduled. Exemplary UL radio frame 150 includes a first portion 151 in which no UL transmission is scheduled; a second portion 152 in which an UL transmission from UE 2 to the eNB is scheduled; a third portion 153 in which an UL transmission from UE 3 is scheduled, a fourth portion 154 in which an UL transmission from UE 1 is scheduled; and a fifth portion 155 in which an UL transmission from an exemplary UE 4 is scheduled. It should be understood that both DL radio frame 100 and UL radio frame 150 could include additional portions that are not depicted in FIG. 1 or described herein.

As depicted in FIG. 1, during the first portion 101 of DL frame 100 when the eNB transmits broadcast channel and control channel information, no UE UL transmission should be scheduled as the UEs are in a receive mode to receive scheduling and other control channel information. (If however, a UE is STR capable, the UE can be scheduled for UL transmission). At the end of first portion 101, both DL transmissions from the eNB and UL transmissions from UEs are scheduled to occur simultaneously. Because the time for a UE to switch from a transmission mode (Tx) to a receive mode (Rx), and from Rx to Tx is generally non-zero, scheduling of DL and UL transmission for a particular UE that does not have STR capability must provide a time delay between DL and UL transmissions so that the UE has sufficient time switch between Tx to Rx modes and Rx to Tx modes. In one exemplary embodiment, a 5 μsec time delay is used for allowing a UE that does not have STR capability to switch between Tx and Rx modes and between Rx and Tx modes. In another exemplary embodiment, a time delay of less than 5 μsec could be used. In still another exemplary embodiment, the respective times to switch between Tx and Rx modes and between Rx and Tx modes are substantially the same. In yet another exemplary embodiment, the respective times to switch between Tx and Rx modes and between Rx and Tx modes differs. Additionally, because as UE may not necessarily have a STR capability, a scheduler device should avoid scheduling DL and UL packets for a particular UE that overlap both in time and carrier frequency. Alternatively, if a UE has STR capability, then a scheduler device can schedule DL and UL packets for the STR-capable UE that overlap both in time and carrier frequency.

If UE is not STR capable, FIG. 1 depicts, for example, that during second portion 102 of DL frame 100, the eNB is transmitting a DL signal to UE 1, while simultaneously UE 2 is transmitting a Lit signal to the eNB during the second portion 152 of UL frame 150. If UE 2 is not STR capable, then a time delay t0 is added to the schedule so that UE 2 has enough time to switch from a Rx mode to a Tx mode. Also as depicted in FIG. 1, a DL transmission from the eNB to UE 2 is scheduled during a third portion 103; consequently, the second portion 152 of UL frame 150 is scheduled to end with enough time t1 for UE 2 to switch from a Tx mode to an Rx mode. During the third portion 153 of UL frame 150. UE 3 is scheduled to transmit a UL signal to the eNB. The exemplary third portion 153 is scheduled to end so that UE 3 has sufficient time t3 to switch from the Tx mode to the Rx mode to receive the scheduled DL signal transmitted from the eNB to UE 3 during the fourth portion 104 of DL frame 100. Additionally, the DL signal from the eNB to UE 1 during second portion 102 of DL frame 100 is scheduled to end so that there is sufficient time t2 for UE 1 to switch from the Rx mode to the Tx mode and transmit a UL signal to the eNB during the fourth portion 154 of the UL frame 150. No DL transmission is scheduled during the fifth portion 105 of DL frame 100, and during the fifth portion 155 of UL frame 150, UE 4 (which for this example is located near an edge of the cell of the eNB, and thereby produces a low received signal power at the eNB) is scheduled to transmit a UL signal when no DL signal is transmitted by the eNB in order to reduce the adverse effects of interference even if UE 4 is STR-capable.

For both STR-capable UE and an STR-incapable UE, during portion 102 of DL signal 100 and portion 152 of UL signal, if the respective UL transmission from UE 2 unacceptably interferes with the UL signal for UE 1, the respective transmission for UE 1 and UE 2 could be scheduled to be at different subbands, thereby reducing the interference. Alternatively and additionally, UE 1 and UE 2 could be selected based on their relative physical positioning in the cell to reduce interference, that is, UE 1 and UE 2 could be selected to be physically far apart in the cell to reduce interference.

For FIG. 1, UE 4 was described as being located near an edge of the cell of the eNB and thereby producing a to received signal power at the eNB; consequently, simultaneous transmit and receive may not work effectively. For situations in which a UE is physically located near an edge of a cell, and/or a received weak signal from a UE, scheduler device may determine to not schedule any DL transmission so that UL transmissions from the UE are reliably received at the eNB. In the situation in which both the eNB and the UE are STR capable, and if the simultaneous transmit and receive is not effective because the STR-capable UE is located near an edge of the cell, the eNB and UE could operate in a TDD-based mode. That is, if either device is transmitting a signal, the other device should not transmit any signal.

In an alternative exemplary embodiment, a UE comprises the capability to communicate the time delay required for the UE to switch from a Tx mode to an Rx mode and/or from an Rx mode to a Tx mode. The scheduler device associated with the eNB could use the specific time delays communicated from a UE to optimize scheduling of simultaneous transmit and receive operation during a radio frame.

Figure 2:
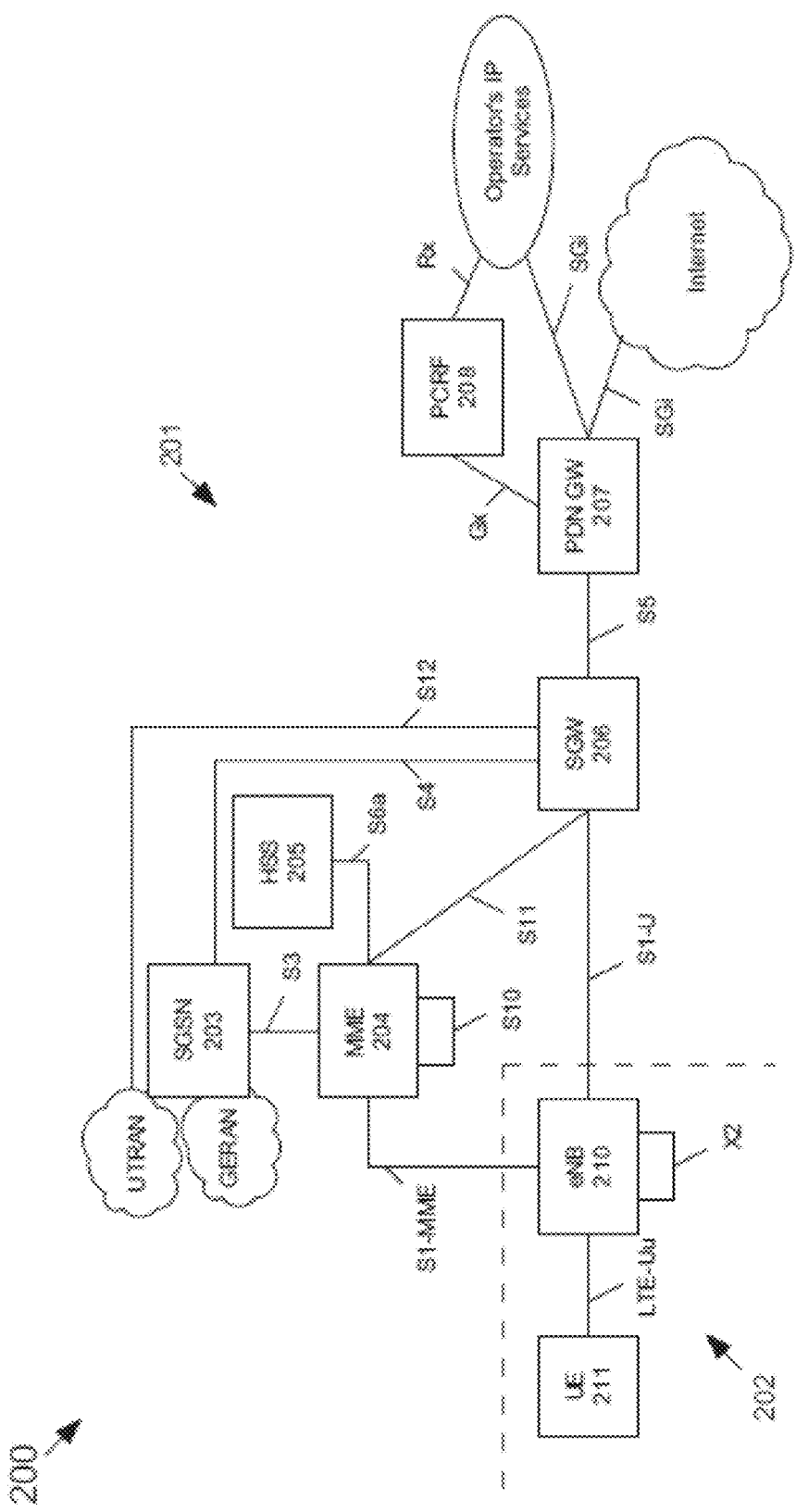
FIG. 2 shorts a block diagram of the overall architecture of an exemplary wireless cellular network that uses STR.

FIG. 2 shows a block diagram of the overall architecture of a Third Generation Partnership Project Long Term Evolution (3GPP LTE) network including network elements and standardized interfaces and utilizing a simultaneous transmit and receive according to the subject matter disclosed herein. At a high level, network 200 comprises a core network (CN) 201 (also referred to as the evolved Packet System (EPC)) and an air-interface access network Evolved Universal Mobile Telecommunication Service (UMTS) Terrestrial Radio Access Network (E-UTRAN) 202. CN 201 is responsible for the overall control of the various User Equipment (UE) connected to the network and establishment of the bearers. E-UTRAN 202 is responsible for all radio-related functions.

The main logical nodes of CN 201 include a Serving General Packet Radio Service (GPRS) Support Node 203, the Mobility Management Entity 204, a Home Subscriber Server (HSS) 205, a Serving Gate (SGW) 206, a Packet Data Network (PDN) Gateway 207 and a Policy and Charging Rules Function (PCRF) Manager 208. The functionality of each of the network elements of CN 201 is well known and is not described herein. Each of the network elements of CN 201 are interconnected by well-known standardized interfaces, some of which are indicated in FIG. 2, such as interfaces S3, S4, S5, etc., although not described herein.

While CN 201 includes many logical nodes, the E-UTRAN access network 202 is formed by one node, the evolved NodeB (eNB) 210, which connects to one or more User Equipment (UE) 211, of which only one is depicted in FIG. 2. For normal user traffic (as opposed to broadcast), there is no centralized controller in E-UTRAN: hence the E-UTRAN architecture is said to be flat. The eNBs are normally interconnected with each other by an interface known as "X2" and to the EPC by an S1 interface. More specifically, to Mobility Management Entity (MME) 204 by an S1-MME interface and to the SGW by an S1-U interface. The protocols that rim between the eNBs and the UEs are generally referred to as the "Applicability Statement (AS) protocols." Details of the various interfaces are well known and not described herein.

The eNB 210 hosts the Physical (PHY), Medium Access Control (MAC), Radio Link Control (RLC), and Packet Data Control Protocol (PDCP layers, which are not shown in FIG. 2, and which include the functionality of user-plane header-compression and encryption. The eNB 210 also provides Radio Resource Control (RRC) functionality corresponding to the control plane, and performs many functions including radio resource management, admission control, scheduling, enforcement of negotiated Up Link (UL) Quality of Service (QoS), cell information broadcast, ciphering/deciphering of user and control plane data, and compression/decompression of DL/UL user plane packet headers.

The RRC layer in eNB 210 covers all functions related to the radio bearers, such as radio bearer control, radio admission control, radio mobility control, scheduling and dynamic allocation of resources to UEs in both uplink and downlink, scheduling of simultaneous transmission and receive, header compression for efficient use of the radio interface, security of all data sent over the radio interface, and connectivity to the EPC. The RRC layer makes handover decisions based on neighbor cell measurements sent by UE 211, generates pages for UEs 211 over the air, broadcasts system information, controls UE measurement reporting, such as the periodicity of Channel Quality Information (CQI) reports, and allocates cell-level temporary identifiers to active UEs 211. The RRC layer also executes transfer of UE context from a source eNB to a target eNB during handover, and provides integrity protection for RRC messages. Additionally, the RRC layer is responsible for the setting up and maintenance of radio bearers.

Figure 3:
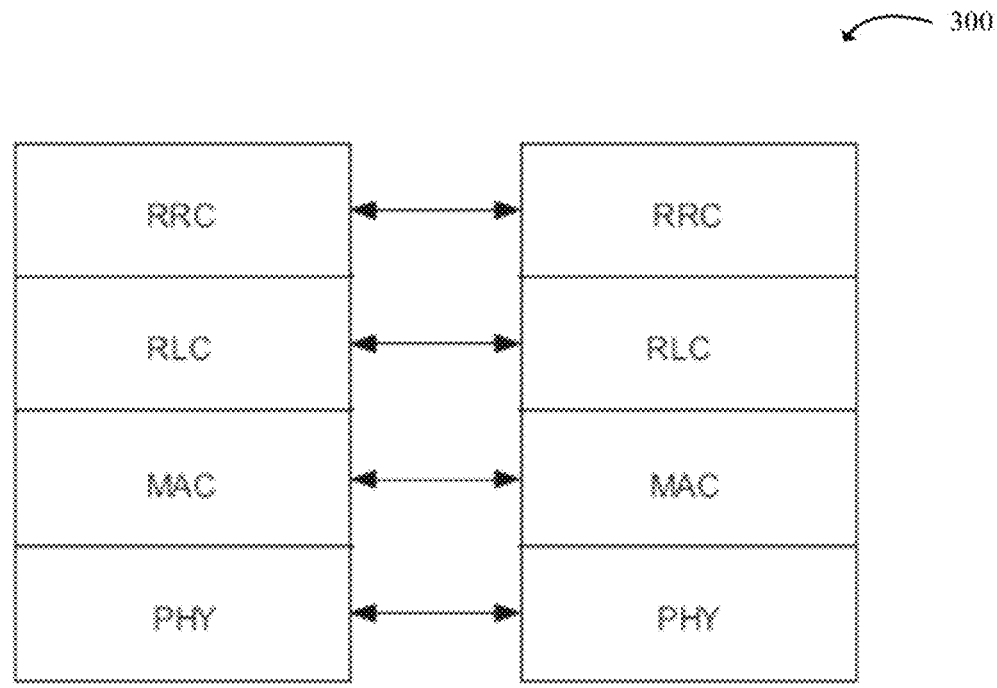
FIGS. 3-4 depict exemplary radio interface protocol structures between a user equipment (UE) and a base station (BS) that use STR.
Figure 4:
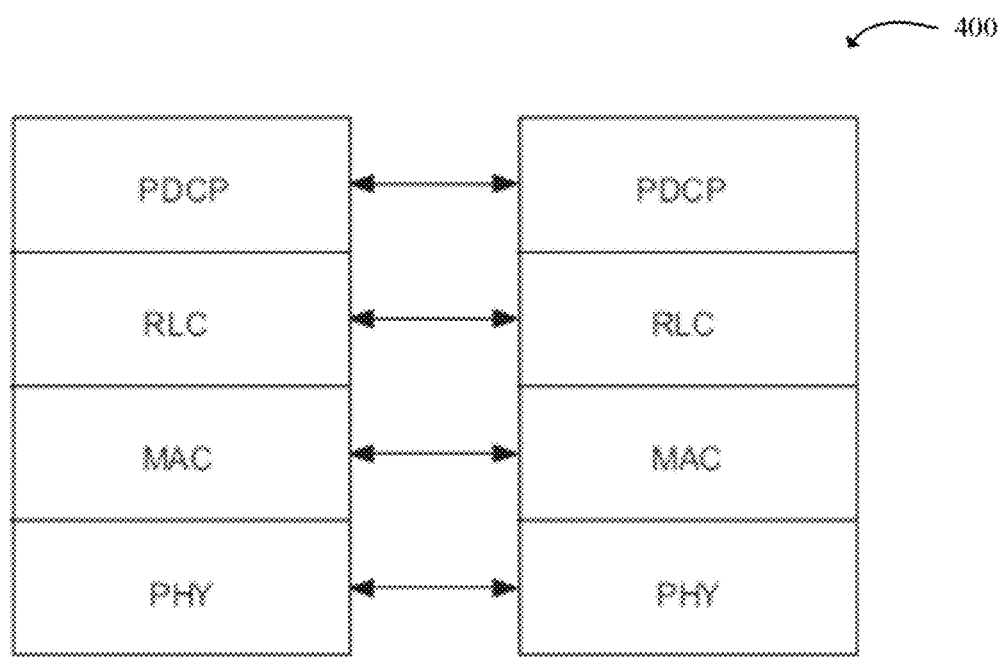

FIGS. 3 and 4 depict radio interface protocol structures between a UE and an eNodeB that are based on a 3GPP-type radio access network standard and that utilize a simultaneous transmit and receive technique in accordance with the subject matter disclosed herein. More specifically, FIG. 3 depicts individual layers of a radio protocol control plane and FIG. 4 depicts individual layers of a radio protocol user plane. The protocol layers of FIGS. 3 and 4 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets in a radio interval with a narrow bandwidth. As a result, only information required for a header part of data can be transmitted so that transmission efficiency of the radio interval can be increased. In addition, in an LTE-based system, the PDCP layer performs a security function that includes a ciphering function for preventing a third parry from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQT) report information, received from first and second layers (L1 and L2).

Figure 5:
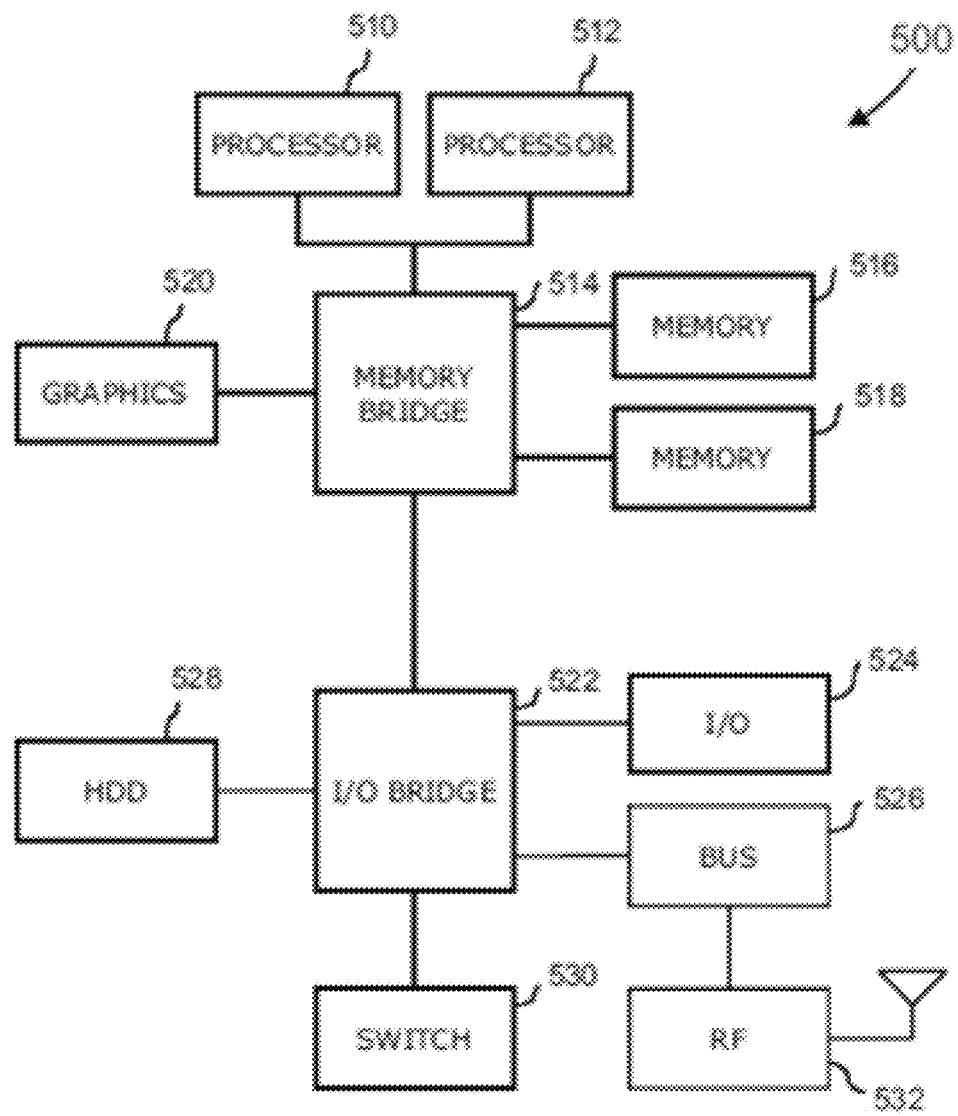
FIG. 5 depicts exemplary functional block diagram of an information-handling system that uses STR.

FIG. 5 depicts functional block diagram of an information-handling system 500 that utilizes a simultaneous transmit and receive technique according to the subject matter disclosed herein. Information-handling system 500 of FIG. 5 may tangibly embody one or more of any of the network elements of core network 200 as shown in and described with respect to FIG. 2. For example, information-handling system 500 may represent the hardware of eNB 210 and/or UE 211, with greater or fewer components depending on the hardware specifications of the particular device or network element. Although information-handling system 500 represents one example of several types of computing platforms, information-handling system 500 may include more or fewer elements and/or different arrangements of elements than shown in FIG. 5, and the scope of the claimed subject matter is not limited in these respects.

Information-handling system 500 may comprise one or more processors, such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor-based memory, for example, volatile-type memory and/or non-volatile-type memory. Memory bridge 514 may couple to a graphics system 520 (which may include a graphics processor not shown) to drive a display device, such as a CRT, an LCD display, an LED display, touch-screen display, etc. (all not shown), coupled to information handling system 500.

Information-handling system 500 may further comprise input/output (I/O) bridge 522 to couple to various types of I/O systems, such as a keyboard (not shown), a display (not shown) and/or an audio output device (not shown), such as a speaker. I/O system 524 may comprise, for example, a universal serial bus (USB) type system, an IEEE-1394-type system, or the like, to couple one or more peripheral devices to information-handling system 500. Bus system 526 may comprise one or more bus systems, such as a peripheral component interconnect (PCI) express type bus or the like, to connect one or more peripheral devices to information-handling system 500. A hard disk drive (HDD) controller system 528 may couple one or more hard disk drives or the like to information handling system, for example, Serial ATA type drives or the like, or alternatively a semiconductor based drive comprising flash memory, phase change, and/or chalcogenide type memory or the like. Switch 530 may be utilized to couple one or more switched devices to I/O bridge 522, for example Gigabit Ethernet type devices or the like. Furthermore, as shown in FIG. 5, information-handling system 500 may include a radio-frequency (RF) block 532 comprising RF circuits and devices for wireless communication with other wireless communication devices and/or via wireless networks, such as core network 200 of FIG. 2, for example, in which information-handling system 500 embodies base station 214 and/or wireless device 216, although the scope of the claimed subject matter is not limited in this respect. In one or more embodiments, information-handling system could comprise an eNB and/or a UE that is provides simultaneous transmit and receive capability according to the subject matter disclosed herein.

Figure 6:
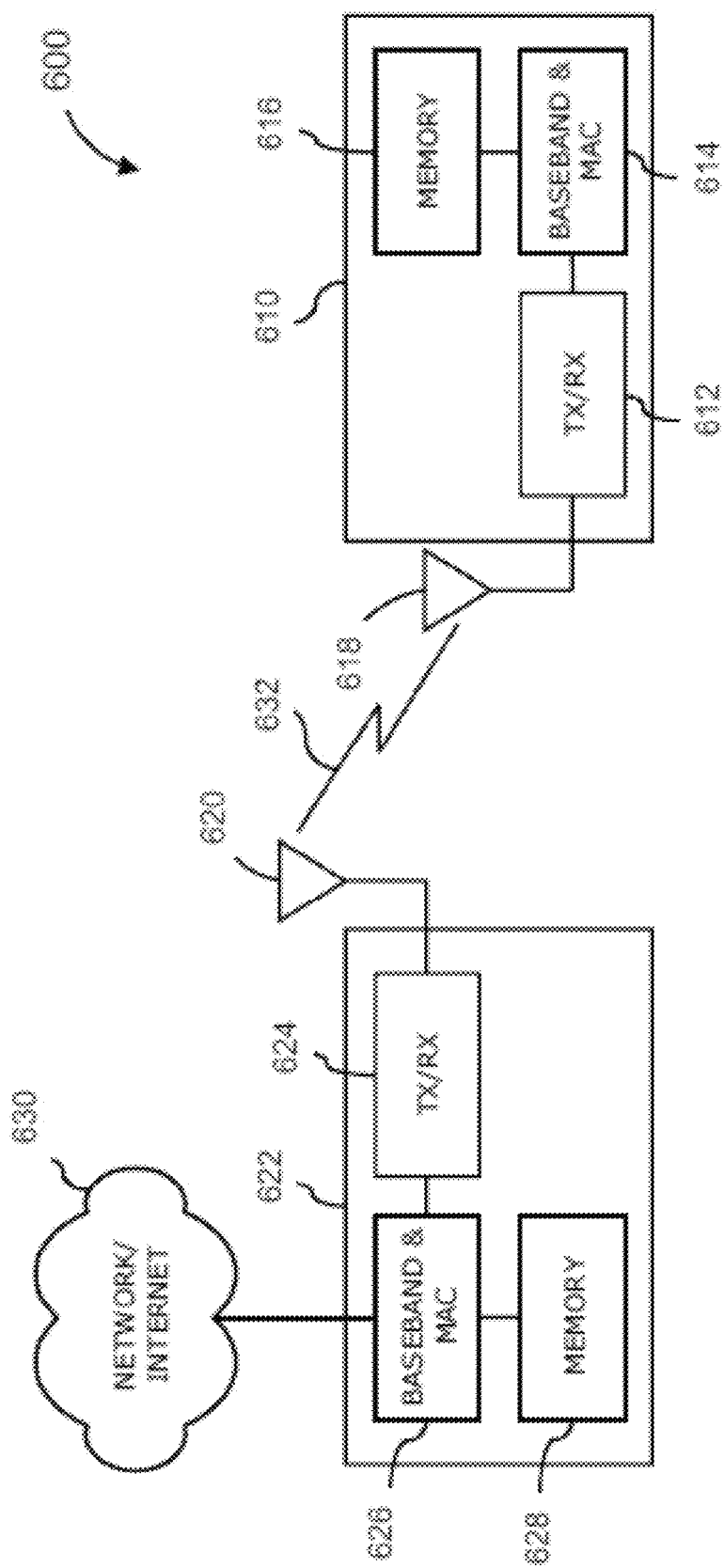
FIG. 6 depicts an exemplary functional block diagram of a wireless cellular network communication system using STR.

FIG. 6 depicts a functional block diagram of a wireless local area or cellular network communication system 600 depicting one or more network devices utilizing a simultaneous transmit and receive technique according to the subject matter disclosed herein. In the communication system 600 shown in FIG. 6, a wireless device 610 may include a wireless transceiver 612 to couple to one or more antennas 618 and to a processor 614 to provide baseband and media access control (MAC) processing functions. In one or more embodiments, wireless device 610 may be a UE that provides simultaneous transmit and receive capability, a cellular telephone, an information-handling system, such as a mobile personal computer or a personal digital assistant or the like, that incorporates a cellular telephone communication module, although the scope of the claimed subject matter is not limited in this respect. Processor 614 in one embodiment may comprise a single processor, or alternatively may comprise a baseband processor and an applications processor, although the scope of the claimed subject matter is not limited in this respect. Processor 614 may couple to a memory 616 that may include volatile memory, such as dynamic random-access memory (DRAM), non-volatile memory, such as flash memory, or alternatively may include other types of storage, such as a hard disk drive, although the scope of the claimed subject matter is not limited this respect. Some portion or all of memory 616 may be included on the same the integrated circuit as processor 614, or alternatively some portion or all of memory 616 may be disposed on an integrated circuit or other medium, for example, a hard disk drive, that is external to the integrated circuit of processor 614, although the scope of the claimed subject matter is not limited in this respect.

Wireless device 610 may communicate with access point 622 via wireless communication link 632, in which access point 622 may include at least one antenna 620, transceiver 624, processor 626, and memory 628. In one embodiment, access point 622 may be an eNB, an eNB having simultaneous transmit and receive scheduling capability, a RRH, a base station of a cellular telephone network, and in an alternative embodiment, access point 622 may be an access point or wireless router of a wireless local or personal area network, although the scope of the claimed subject matter is not limited in this respect. In an alternative embodiment, access point 622 and optionally mobile unit 610 may include two or more antennas, for example, to provide a spatial division multiple access (SDMA) system or a multiple-input-multiple-output (MIMO) system, although the scope of the claimed subject matter is not limited in this respect. Access point 622 may couple with network 630 so that mobile unit 610 may communicate with network 630, including devices coupled to network 630, by communicating with access point 622 via wireless communication link 632. Network 630 may include a public network, such as a telephone network or the Internet, or alternatively network 630 may include a private network, such as an intranet, or a combination of a public and a private network, although the scope of the claimed subject matter is not limited in this respect. Communication between mobile unit 610 and access point 622 may be implemented via a wireless local area network (WLAN), for example, a network compliant with a an Institute of Electrical and Electronics Engineers (IEEE) standard, such as IEEE 802.11a, IEEE 802.11b, HiperLAN-II, and so on, although the scope of the claimed subject matter is not limited in this respect. In another embodiment, communication between mobile unit 610 and access point 622 may be at least partially implemented via a cellular communication network compliant with a 3GPP standard, although the scope of the claimed subject matter is not limited in this respect. In one or more embodiments, antenna(s) 618 may be utilized in a wireless sensor network or a mesh network, although the scope of the claimed subject matter is not limited in this respect.

Figure 7:
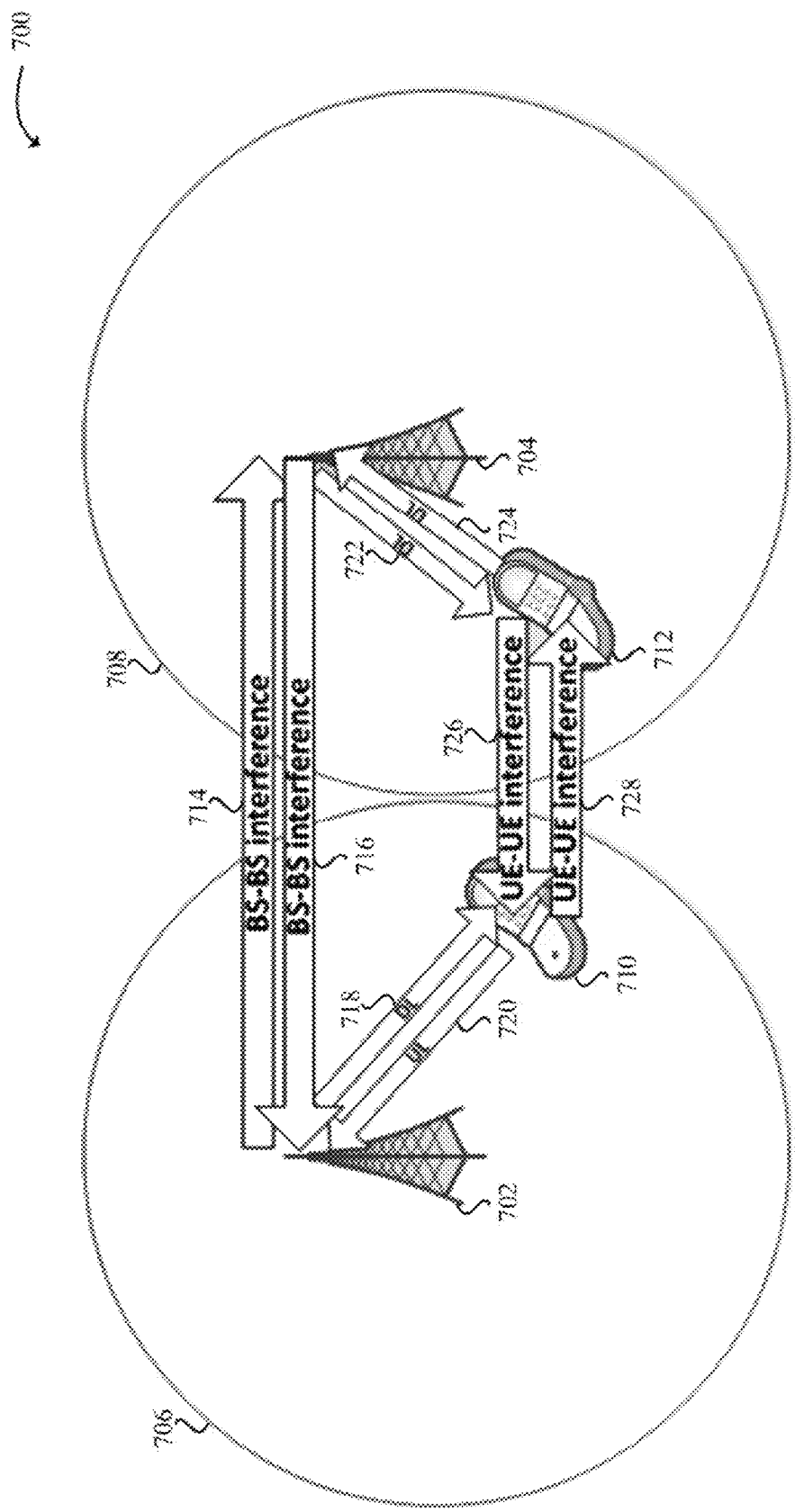
FIG. 7 illustrates types of interference that may be encountered in a wireless cellular network using STR.

Turning now to BS-BS interference in wireless cellular networks using STR, FIG. 7 illustrates types of interference that may be encountered in a wireless cellular network using STR. A simplified depiction of a wireless cellular network 700 is depicted with a BS 702, a BS 704, a UE 710, and a UE 712. The BS 702 covers a cell area 706 while the BS 704 covers a cell area 708. The UE 710 is located in the cell area 706 and is thereby communicatively connected to or associated with the BS 702, while the UE 712 is located in the cell area 708 and is thereby communicatively connected to or associated with the BS 704. That is, the UE 710 has a DL 718 and an UL 720 to and from the BS 702, while the UE 712 has a DL 722 and an UL 724 to and from the BS 704.

The wireless cellular network 700 illustrated in FIG. 7 is capable of using STR. While STR allows transmission and reception on the same frequency at the same time and can potentially double the physical layer capacity, as depicted, STR may introduce two new unique interferences into a wireless cellular network, as previously discussed. There may be UE-UE interference due to transmissions by the UE 710 that interfere with reception at the UE 712. Conversely, there may be UE-UE interference due to transmissions by the UE 712 that interfere with reception at the UE 710. In particular, these interferences may occur in both the ULs 720, 724 and DLs 718, 722 transmission directions. More to the point, due to STR, the UL 720 may interfere with DL 722, and DL 718 may be corrupted by UL 724. Hence any proximate UE pairs may interfere with each other and result in a reduction or loss of capacity. In addition to UE-UE interference, there may also be BS-BS interferences 714 and 716. These two new interferences may degrade system performance if not handled appropriately.

In order to minimize UE-UE interference and increase capacity in the wireless cellular network, a downlink centric measurement threshold and an uplink centric measurement threshold can be configured at an eNB based on a DL/UL ratio of the eNB in the wireless cellular network. For instance, a signal measurement command may be transmitted from the eNB to the UE instructing the UE to take a signal quality measurement. Once the signal quality measurement is received by the UE, the UE may perform one or more signal quality measurements and transmit the results to the eNB. The eNB may determine whether the signal quality measurements are greater than the thresholds and further instruct the UE to operate in STR-mode or non-STR-mode. The UE may also be provided the thresholds and autonomously determine whether the thresholds have been exceeded and operate in STR or non-STR mode accordingly.

Figure 8:
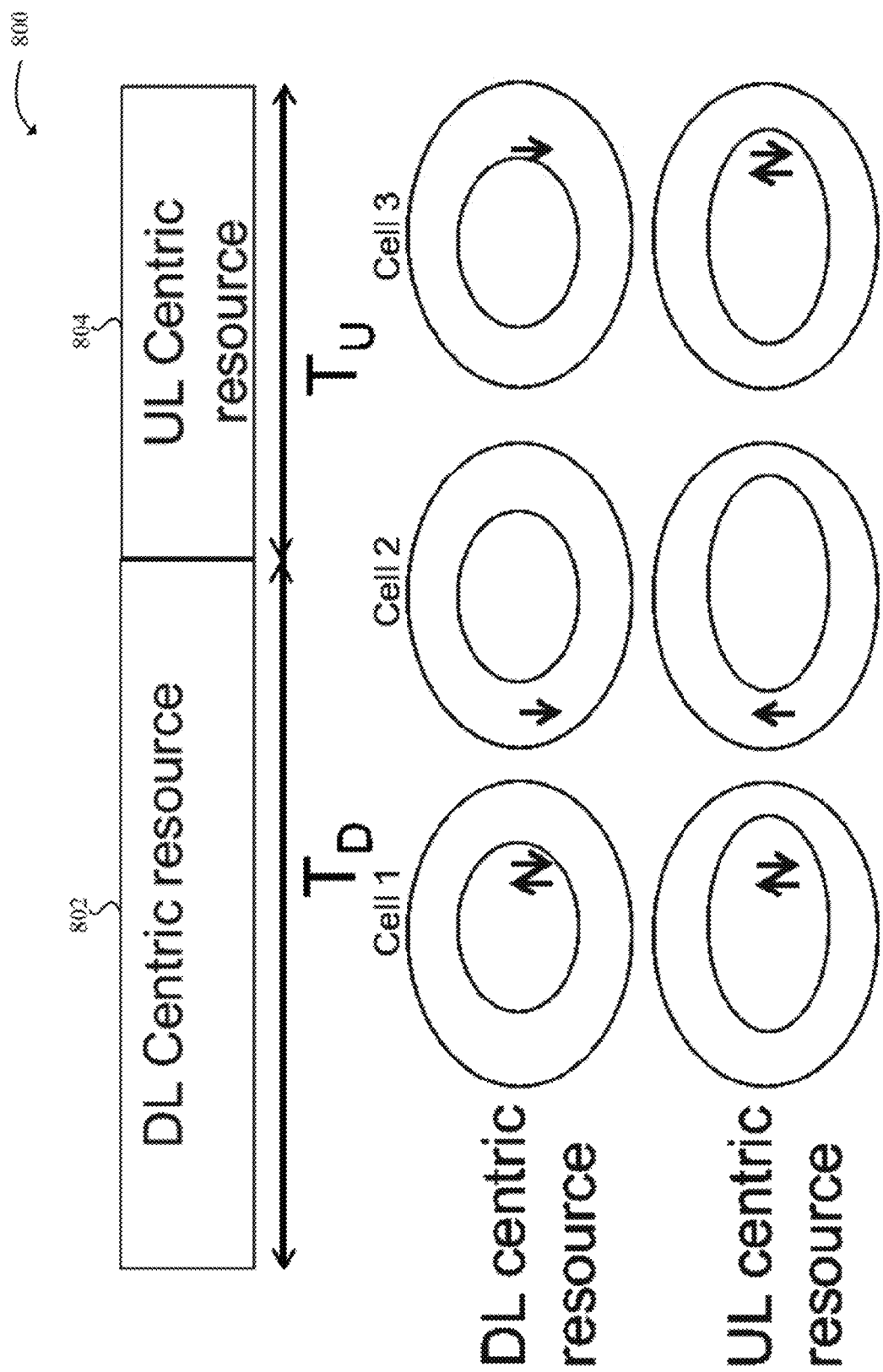
FIG. 8 shows an exemplary basic resource block structure for increasing capacity in a wireless cellular network using STR by selective use of STR.

FIG. 8 shows an exemplary basic resource block structure for increasing capacity in a wireless cellular network using STR by selective use of STR. Starting off with half duplex communication, a basic resource block 800 is provided where the basic resource block 800 is split into two parts 802, 804. A DL centric, resource S02 with a size of $T_D$ and an UL centric resource with a size of $T_U$ are allocated from the basic resource block 800. With the DL centric resource, a UE which may be able to benefit from additional UL by using STR are selected. That is, UEs are selected that may be able to increase capacity in the wireless cellular network by using STR. While the additional UL resource may increase UL capacity, it may also create UE-UE interferences in DL transmissions in other cells. This can result in a reduction of downlink capacity in adjacent cells. In other words, the additional UL gain should be balanced against the DL loss.

In order to balance the gains from using STR relative to the losses caused by interference, the additional UL gain can be balanced against the DL loss. A UE may perform a signal quality measurement, such as a DL signal to interference and noise ratio (SINR) test, at the UE. The result of the SINR test may be used to choose whether the UE can use STR with the DL centric resource in order to increase capacity in the wireless cellular network. More generally, multiple respective SINR measurements may be used to choose multiple Us to use STR with the DL centric resource. The technique may similarly be used with the UL centric resource to select UEs to use STR with the UL centric resource. In this way, FIG. 8 illustrates areas of cells 1, 2 and 3 which operate in STR mode or non-STR mode in either the DL centric resource or the UL centric resource. Of particular note, is that generally areas towards the periphery of a cell may overlap other cells. The amount of interference caused by STR at the periphery may be greater than the gains. Therefore, it may not be suitable for UEs towards the periphery of a cell to use STR. In other words, it may not increase capacity in the wireless cellular network to have UEs in the periphery of a cell operate in an STR-mode.

Figure 9:
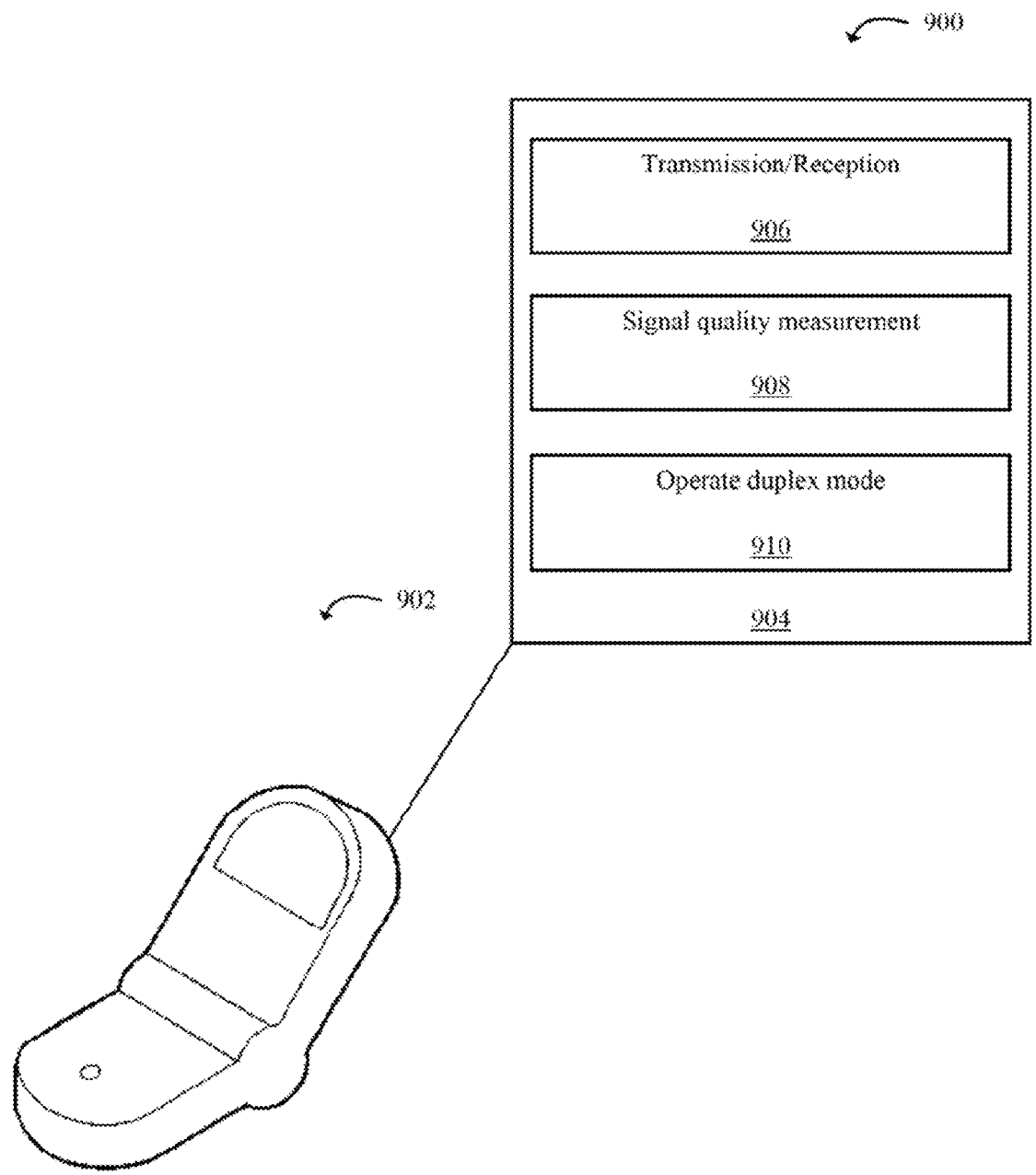
FIG. 9 illustrates exemplary modules in a UE in a wireless cellular network using STR.

FIG. 9 illustrates exemplary modules in a UE in a wireless cellular network 900 using STR. In particular, the UE 902 may have a set of computer circuitry and/or modules 904 configured for the UE 902 to perform full duplex radio communication in a wireless cellular network. For instance, the UE 902 may have a transmission/reception module 906 to receive a signal quality measurement command from an eNB. When commanded, the eNB can measure a signal quality and transmit the signal quality measurement to the eNB. Further the transmission/reception module 906 may receive a duplex communication mode command from the eNB that is based on the signal quality measurement.

A signal quality measurement module 908 may also be configured to operate with the UE 902. The signal quality measurement module 908 may perform the measurement of the signal quality at the UE 902. In receiving the duplex communication mode command, an operate duplex mode module 910 can configure the UE 902 to operate in full duplex communication mode or half-duplex communication mode as dictated by the duplex communication mode command. Network capacity gain using STR should generally be larger than the network loss sustained through using STR. By checking a signal quality at respective UEs, UEs that provide a net network capacity gain may be identified. A signal quality threshold may be set at Of near the point in which the use of STR provides a net network capacity gain so that UEs can be quickly and reliably set to use STR-mode where appropriate.

Additionally, one or more of the following features may be included in the UE 902. The signal quality threshold may include a signal to interference and noise ratio (SINR) at the UE 902, a signal to interference ratio (STR) at the UE 902 a signal to noise ratio (SNR) at the UE 902, and/or may be relative to interference from adjacent UEs. The UE 902 may include an antenna, a touch sensitive display screen, a speaker, a microphone, a graphics processor, an application processor, internal memory, or a non-volatile memory port.

Figure 10:
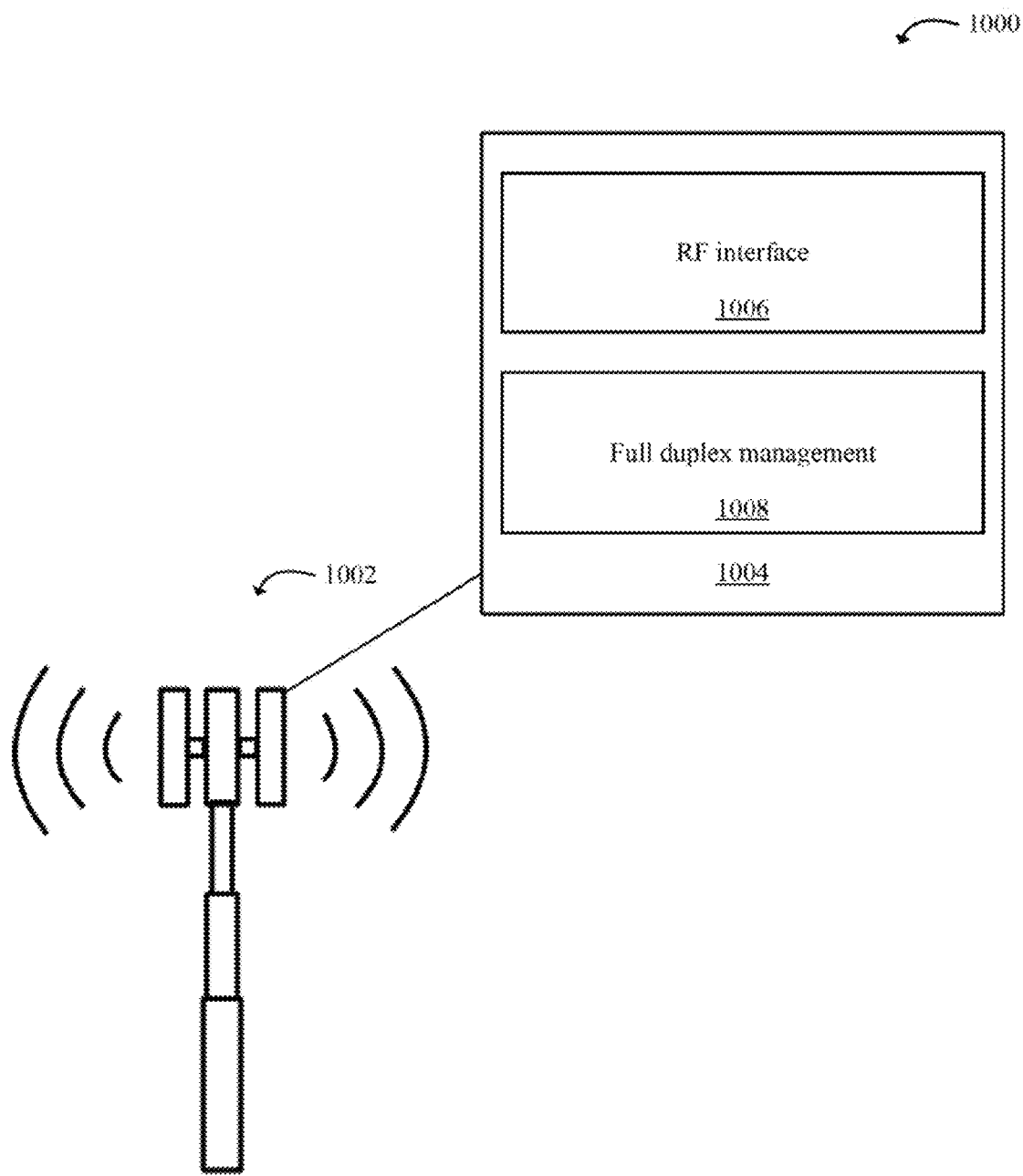
FIG. 10 illustrates exemplary modules in a BS in a wireless cellular network using STR.

FIG. 10 illustrates exemplary modules in a wireless node in a wireless cellular network 1000 using STR. In particular, a wireless node 1002 is shown in the wireless cellular network 1000 that may have a set of computer circuitry and/or modules 1004 therein. For example, an RF air interface module 1006 is provided in the wireless node 1002 that is configured with an uplink and a downlink to communicate with a UE. A full duplex management module 1008 is coupled to the RF air interface module 1006 to set up and manage a downlink centric resource and an uplink centric resource and signal quality thresholds for full duplex communication in a wireless cellular network. The full duplex management module 1008 is configured to communicate signal quality thresholds using the downlink on the RF air interface module 1006 to a UE. A ratio between the downlink centric resource and the uplink centric resource and the signal quality thresholds are set with the full duplex management module 1008 to increase capacity in the wireless cellular network.

Additionally, one or more of the following features may be included in the wireless node 1002. The signal quality threshold may include a signal to interference and noise ratio (SINTR) at the UE, a signal to interference ratio (STR) at the UE, a signal to noise ratio (SNR) at the UE, and/or may be relative to interference from adjacent UEs. The wireless node may be a BS, a Node B, an eNB, a baseband unit (BBU), a remote radio head (RRH), a remote radio equipment (RRE), a remote radio unit (RRU), or a central processing module (CPM).

Figure 11:
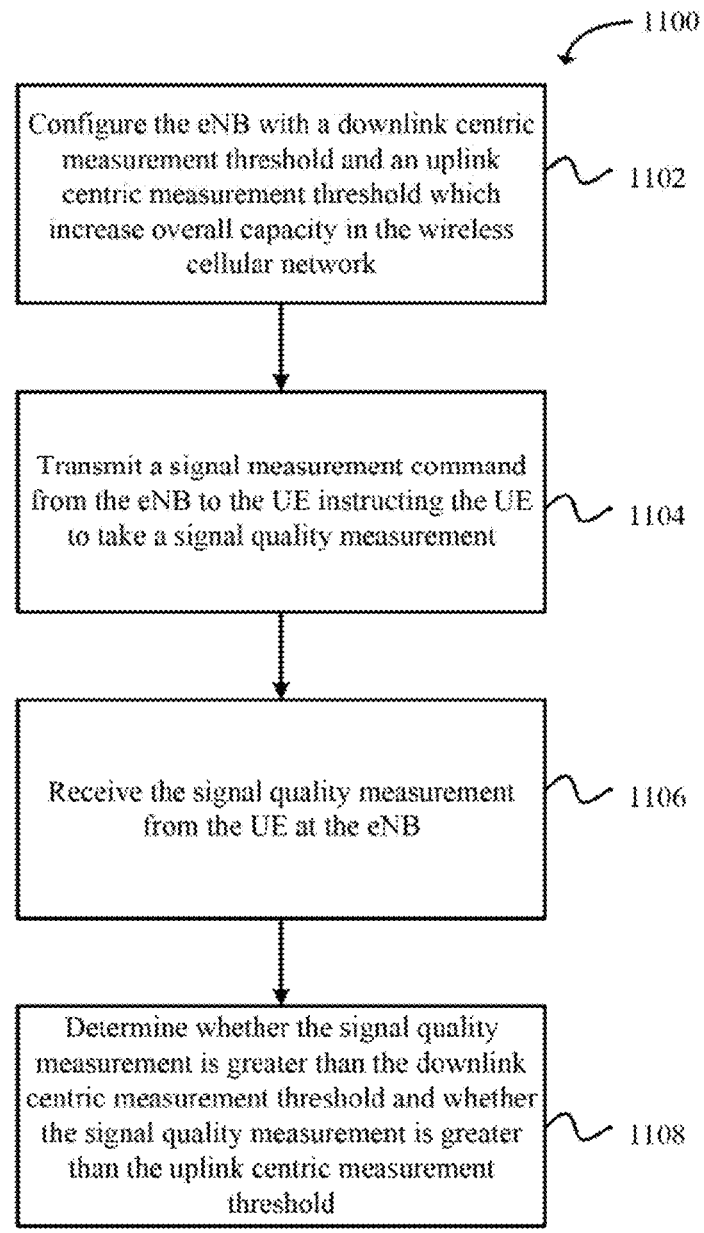
FIG. 11 a flowchart of an exemplary method for increasing capacity in a wireless cellular network using STR by selective use of STR.

Another example provides a method 1100 for increasing capacity in a wireless cellular network using STR by selective use of STR, as shown in the flow chart in FIG. 11. The method may be executed as instructions on a machine, where the instructions are included on at least one computer readable medium or at least one non-transitory machine readable storage medium.

The method 1100 can include the operation of configuring the eNB with a downlink centric measurement threshold and an uplink centric measurement threshold which maximize overall capacity in the wireless cellular network, as in block 1102. This ratio may be set by a network operator based on measurements of signal quality made in the cellular network which maximizes overall network capacity. The method may include transmitting a signal measurement command from the eNB to the UE instructing the UE to take a signal quality measurement, as in block 1104. The method may include receiving the signal quality measurement from the UE at the eNB, as in block 1106. An additional operation can include determining whether the signal quality measurement is greater than the downlink centric measurement threshold and whether the signal quality measurement is greater than the uplink centric measurement threshold, as in block 1108. The downlink centric measurement threshold, the uplink centric measurement threshold, and the DL/UL may be configured to increase capacity in the wireless cellular network through selective use of STR.

The method may include one or more of the following features. The method 1100 may include transmitting an STR mode command from the eNB to the UE instructing the UE to operate in an STR mode on the uplink centric resource when the determination is that a signal quality measurement is greater than the uplink centric measurement threshold. The method 1100 may include transmitting an STR mode command from the eNB to the UE instructing the UE to operate in a non-STR mode on the uplink centric resource when the determination is that the signal quality measurement is less than the uplink centric measurement threshold.

The method 1100 may include transmitting an STR mode command from the eNB to the UE instructing the UE to operate in an STR mode on the downlink centric resource when the determination is that the signal quality measurement is greater than the downlink centric measurement threshold. The method 1100 may include transmitting an STR mode command from the eNB to the UE instructing the UE to operate in a non-STR mode on the downlink centric resource when the determination is that the signal quality measurement is less than the downlink centric measurement threshold. The DL/UL ratio may be set by a wireless cellular network operator. The uplink centric measurement threshold or the downlink centric measurement threshold comprises a signal to interference and noise ratio (SINR) at the UE. The uplink centric measurement threshold or the downlink centric measurement threshold comprises a signal to interference ratio (SIR) at the UE. The uplink centric measurement threshold or the downlink centric measurement threshold comprises a signal noise ratio (SNR) at the UE. The uplink centric measurement threshold or the downlink centric measurement threshold is relative to interference from adjacent UEs. The method 1100 may be embodied on at least one non-transitory machine readable storage medium having a plurality of instructions adapted to be executed to implement the method 1100.

Figure 12:
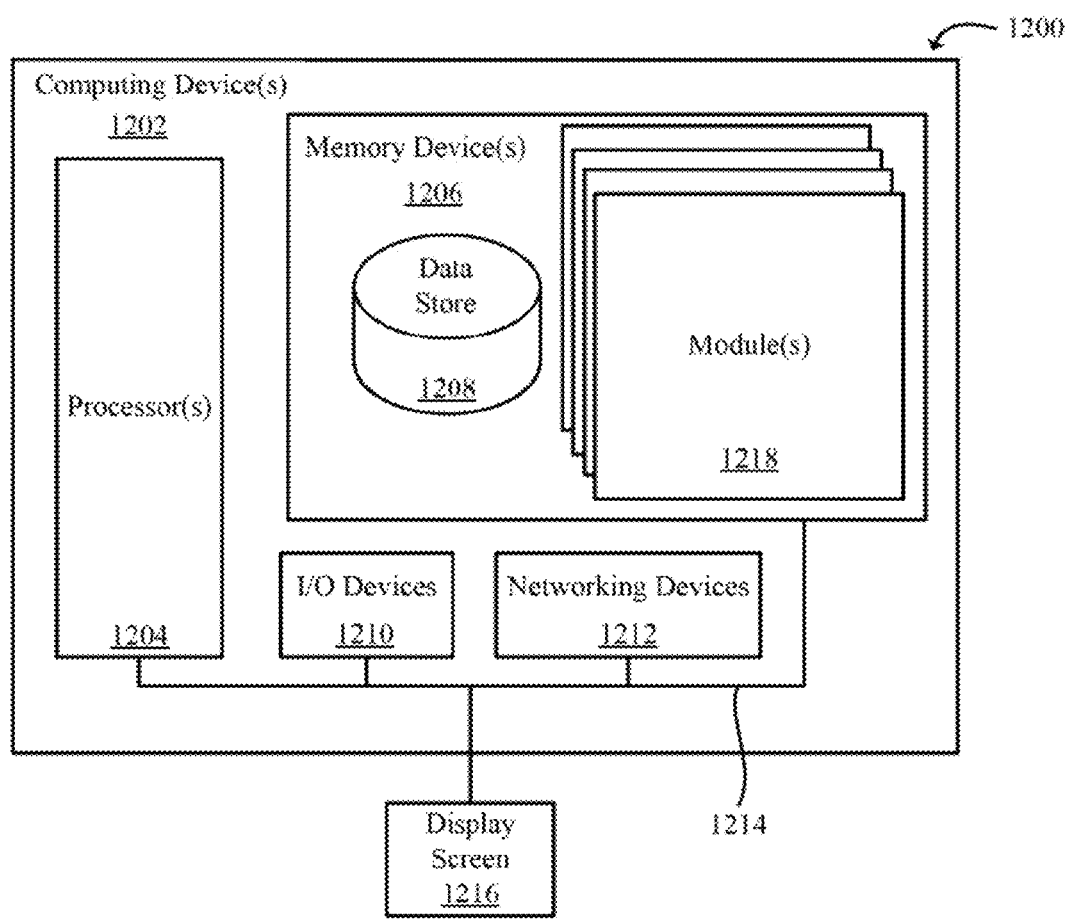
FIG. 12 is block diagram illustrating an example of a computing device that may be used for increasing capacity in a wireless cellular network using STR by selective use of STR.

FIG. 12 is block diagram illustrating an example of a computing device that may be used for increasing capacity in a wireless cellular network using STR by selective use of STR. In particular, the computing device 1202 illustrates a high level example of a device on which modules of the disclosed technology may be executed. The computing device 1202 may include one or more processors 1204 that are in communication with memory devices 1206. The computing device 1202 may include a local communication interface 1214 for the components in the computing device. For example, the local communication interface may be a local data bits and/or any related address or control busses as may be desired.

The computing device 1202, for instance, may be used to reduce interference between BSs in a wireless cellular network operating with STR. For example, the computing device 1202 may be used to form a downlink transmission and an uplink receive beam at a BS. The beam pattern may have predetermined mills that are formed over predetermined elevation angles to reduce interference with a proximate BS. The computing device 1202 may then be used to transmit and receive using the beam pattern from the BS. In this way transmission and reception may occur simultaneously using STR.

In particular, the memory device 1206 may contain a set of modules 1218 that are executable by the processor(s) 1204 and data for the modules. Located in the memory device 1206 are the set of modules 1218 executable by the processor. The modules may execute the functions described earlier. A data store 1208 may also be located in the memory device 1206 for storing data related to the modules and other applications along with an operating system that is executable by the processor(s) 1204.

Other applications may also be stored in the memory device 1206 and may be executable by the processor(s) 1204. Components or modules discussed in this description that may be implemented in the form of software using high programming level languages that are compiled, interpreted or executed using a hybrid of the methods.

The computing device may also have access to I/O (input/output) devices 1210 that are usable by the computing devices. An example of an I/O device is a display screen 1216 that is available to display output from the computing devices. Other known I/O devices may be used with the computing device as desired. Networking devices 1212 and similar communication devices may be included in the computing device. The networking devices 1212 may be wired or wireless networking devices that connect to the internet, a LAN, WAN, or other computing network.

The components or modules that are shown as being stored in the memory device 1206 may be executed by the processor(s) 1204. The term "executable" may mean a program file that is in a form that may be executed by a processor 1204. For example, a program in a higher level language may be compiled into machine code in a format that may be loaded into a random access portion of the memory device 1206 and executed by the processor 1204, or source code may be loaded by another executable program and interpreted to generate instructions in a random access portion of the memory to be executed by a processor. The executable program may be stored in any portion or component of the memory device 1206. For example, the memory device 1206 may be random access memory (RAM), read only memory (ROM), flash memory, a solid state drive, memory card, a hard drive, optical disk, floppy disk, magnetic tape, or any other memory components.

The processor 1204 may represent multiple processors and the memory device 1206 may represent multiple memory units that operate in parallel to the processing circuits. This may provide parallel processing channels for the processes and data in the system. The local interface 1214 may be used as a network to facilitate communication between any of the multiple processors and multiple memories. The local interface 1214 may use additional systems designed for coordinating communication such as load balancing, bulk data transfer and similar systems.

Figure 13:
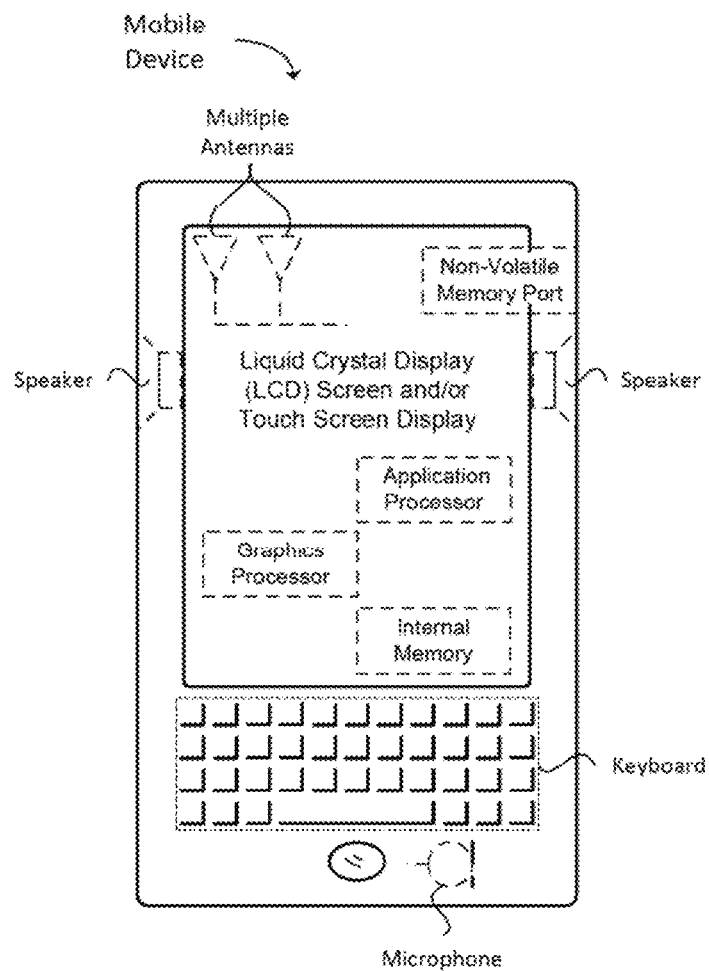
FIG. 13 is illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP UE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to perform full duplex radio communication in a wireless cellular network, having computer circuitry configured to:
   receive a signal quality measurement command from an evolved node B (eNB) at the UE;
   measure a signal quality at the UE in response to the signal quality measurement command to form a signal quality measurement at the UE;
   transmit the signal quality measurement to the eNB to enable the eNB to:
      identify a net network capacity gain by checking the signal quality measurement at the UE; and
      set a signal quality threshold based on a signal quality level that results in the net network capacity gain in order to use simultaneous transmission and reception (STR);
   receive a duplex communication mode command from the eNB that is based on the signal quality threshold; and
   operate the UE in full duplex communication mode or half-duplex communication mode as dictated by the duplex communication mode command.

2. The computer circuitry of claim 1, wherein the signal quality measurement comprises a signal to interference and noise ratio (SINR) at the UE.

3. The computer circuitry of claim 1, wherein the signal quality measurement comprises a signal to interference ratio (SIR) at the UE.

4. The computer circuitry of claim 1, wherein the signal quality measurement comprises a signal noise ratio (SNR) at the UE.

5. The computer circuitry of claim 1, wherein the signal quality measurement comprises interference from adjacent UEs.

6. The computer circuitry of claim 1, wherein the UE includes an antenna, a touch sensitive display screen, a speaker, a microphone, a graphics processor, an application processor, internal memory, or a non-volatile memory port.

* * * * *